June 11, 1957   C. O. HOLYCROSS ET AL   2,795,440
JOINT AND METHOD OF UNITING CARBON BODIES
Filed March 23, 1954
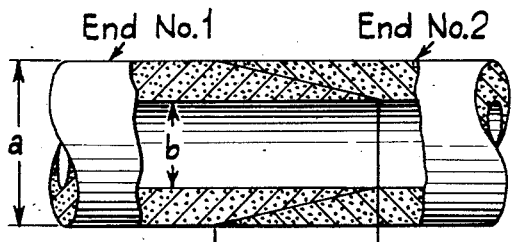
Fig. 1.
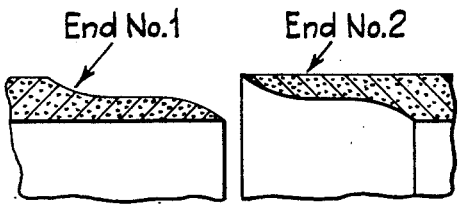
Fig. 4.
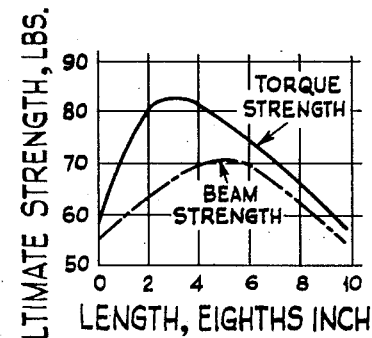
Fig. 2.
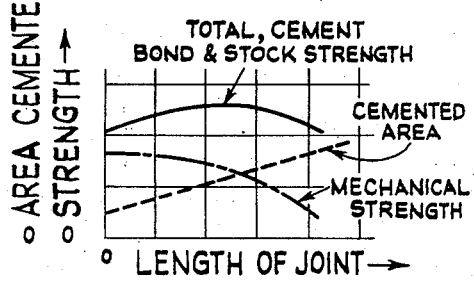
Fig. 3.
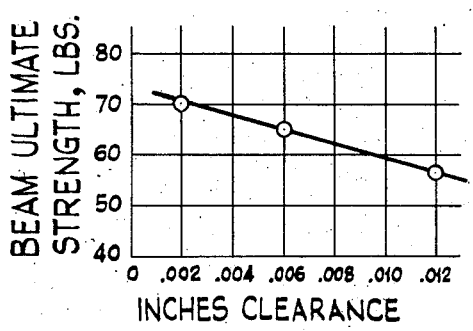
Fig. 6.
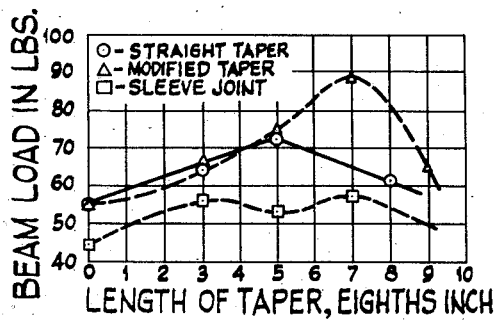
Fig. 5.
Fig. 7.
Fig. 8.
INVENTORS
CLAYTON O. HOLYCROSS
SAMUEL H. S. RAUB
BY John F. Hohmann
ATTORNEY United States Patent Office 2,795,440
Patented June 11, 1957

2,795,440

JOINT AND METHOD OF UNITING CARBON BODIES

Clayton O. Holycross, Cleveland, and Samuel H. S. Raub, Bay Village, Ohio, assignors to Union Carbide and Carbon Corporation, a corporation of New York Application March 23, 1954, Serial No. 418,024

7 Claims. (Cl. 285—284)

This invention relates to a method of uniting shaped carbonaceous articles, and more specifically to a method of uniting plain and resin impregnated carbon and graphite pipes.

Practical considerations in the processes of extruding and handling green lengths, packing for gas bake, furnacing and cleaning, limit the length of commercially available carbon and graphite pipes to dimensions substantially less than those frequently found necessary for use in industry. To produce longer structures, it has been the conventional practice hitherto to join smaller units by inserting and cementing the tapered pipe ends in an external collar or sleeve. Where the completed assembly is intended for use in connection with chemical processes, it is often essential that such collar or sleeve also be of carbon. This practice, however, has obvious disadvantages, as the overlapping joints thus made necessarily result in greater clearance requirements and decrease strength since, according to accepted theories of stress concentration, irregularities of this type are points of localized stress. Here, too, the susceptibility to chemical attack of the cement film in the joint presents an additional important problem. As a result of such attack, the joint may become leaky, and require dismantling for repairs. It is particularly inconvenient that this should be the case, inasmuch as deterioration at the joint takes place usually long before the other two parts have served their normal period of usefulness.

It is accordingly the prime object of this invention to provide a method of uniting carbon bodies which will make their junction possible without resultant decreased strength or increased clearance requirements.

Another object of this invention is to provide carbon and graphite pipe joints which will be cheap to manufacture, easy to machine and to control.

These objects are obtained by the practice of this invention, which essentially consists in concentrically profiling one of said articles so as to enable it to receive a complementarily profiled end of another article; applying a self-hardening cement to one of said ends and interfitting said articles.

In the drawings:

Fig. 1 is a side elevational view, partly in section, of a joint made according to the method of this invention.

Fig. 2 is a pair of curves representing the critical relationship between the length of a joint such as shown in Fig. 1 and its ultimate strength under beam and torque loading.

Fig. 3 is a set of curves illustrating the relationship between cement strength, stock strength and joint length.

Fig. 4 represents an elevational view of another type of joint profiling.

Fig. 5 represents the same joint completed with clearance between its ends.

Fig. 6 is a single curve showing the dependency of ultimate beam strength upon the clearance of such a joint.

Fig. 7 represents a stress-relieved modification of the invention.

Fig. 8 is a graph comparing the ultimate strengths of the preferred embodiments of the invention with conventional sleeve joints.

While the method of this invention is generally applicable to the joining of shaped carbon articles, it will be described in detail for the sake of simplicity with reference to the joining of carbon pipes or conduits such as find extensive use in heat exchangers and other similar tubular systems.

Broadly construed in that light, the invention resides in the selection of optimum critical angles and lengths of external and internal taper at the ends of the pipes joined, the tapers in each case being concentric with the pipe. This preliminary step is followed by the cementing together of the spliced ends, and by the heat treating of the jointed pieces.

The selection of the critical taper dimensions conducive to the attaining of maximum ultimate beam strength of joints was obtained by testing under torque and beam loading many specimens of spliced pipe joints profiled as indicated by Fig. 1, wherein the internal diameter, outside diameter, clearance between joint members, and length of taper shall hereinafter be referred to as "$b$," "$a$," "$c$" and "$L$," respectively.

Several self-hardening or thermosetting cements have been found suitable in the practice of this invention. To hasten the process, the cement may be acid catalyzed if desired. One such cement used had the following composition:

| | Parts by weight |
|---|---|
| Finely divided carbon | 30 |
| Phenolic resin | 100 |
| Hypophosphorous acid | 1 |

Upon application of the cement the joint is held in position and allowed to stand for about four hours. Next the composite article is heated by radiation or otherwise for a period of time varying from 8 to 24 hours. This heating step, however, may be omitted and replaced, if desired, by standing the articles at room temperature for about two weeks.

As an example of the practice of this invention, two carbon pipes having an inside diameter "$b$" of ⅞ inch, an outside diameter "$a$" of 1¼ inches, the tapered length "$L$" being ⅝ inch, straight taper, as indicated in Fig. 1, were joined by pressing and maintaining together with suitable clamps ends 1 and 2, which had been coated with a film of cement having the composition disclosed above. This joint was allowed to stand for four hours at room temperature, and was heated for eight hours on a steam table.

An alternate method which has given satisfaction comprises the same steps indicated above except that the leading edges are rounded to provide a spatulate form and a clearance "$c$" between the two units comprising the joint; as shown on Figs. 4 and 5. This effect ensures the smearing of cement into the joint instead of scraping it out. Ultimate breaking strengths for joints of this type are given in Fig. 6. The "inches" and "clearance" shown on the abscissa refer to the clearance "$c$" of Fig. 5 between units of the joint. It is readily observed from Fig. 6 that the ultimate beam strength of such joints decreases with increased clearance. It has been found that the preferred range of clearance to be used is between 0.002 and 0.006 inch.

A preferred embodiment of this invention made as the previous example, is shown on Fig. 7. In this profiling the outer feathered edge of the internally tapered member was stress relieved as shown by means of a concentric clearance or chamfering "$e$," so as to have less cement pressure at that edge. Using resin-impregnated pipes having an inside diameter of 1.156 inches, taper length of 7/8 inch and a clearance "e" between 1 and 2 of approximately 0.004 inch, it was possible to prepare a joint having unusual and unexpected strength. Whereas the plain pipes used have an ultimate beam strength of 82 pounds, the joint made as described was found to have an ultimate beam strength of 88 pounds. The same result can be gained by removing material equivalent to clearance "e" from the externally tapered member.

Angle d, which is the same for both ends of the joint, is the angle between the leading edges and the longitudinal axis of the pipe wall, and is decreased as the length of the taper is increased as indicated in the table below.

| Taper Length | "d" |
|---|---|
| 3/8" | 26½° |
| 5/8" | 16½° |
| 7/8" | 12° |
| 1⅛" | 9½° |

It is thus apparent from this and from the data of Fig. 8 that there exists an optimum length of taper which will provide maximum beam strength in particular cases. These results are tabulated below for a joint made from plain pipes having an ultimate beam strength of 82 pounds.

*Ultimate beam strength, pounds*

| Joint Design | Joined Pipe | | | | | |
|---|---|---|---|---|---|---|
| | 0 Taper (Butt) | 3/8" Taper | 5/8" Taper | 7/8" Taper | 1" Taper | 1⅛" Taper |
| (1) Plain taper of Fig. 1 | 55.4 | 65.0 | 71.0 | | 61.4 | |
| (2) Modified taper | | 64.3 | 72.9 | 88.0 | | 65.7 |
| (3) Conventional taper-in sleeve | 44.5 | 56.1 | 52.6 | 56.1 | | |

The graphical representation of the strength of tapered joints is given in Fig. 3. It is obvious from it that as the length of tapered joint is increased, the area of cemented surface increases, all other variables being constant, so that available strength of cement bond in terms of pounds per square inch increases in a straight line proportion. On the other hand, the mechanical strength of the carbon stock, particularly that of end No. 2 which is stressed in tension during assembly to end No. 1, decreases rapidly as "L" increases. The factor of simple stock strength during machining and assembly with tendency of end No. 2 to split as the edge becomes thinner, overrules the gain derived by increasing the area of cemented surface. This result depends in large part on the wide difference between compressive and tensile strength of carbon and graphite stock. The compressive strength being often ten times greater than the tensile strength, failure almost always occurs in tension even when the material is loaded in compression or shear. Such failure in tension when loaded in shear is illustrated by the type of break occurring under torque, this being a long spiral instead of an approximately flat face.

An additional weakness of carbon and graphite material which is avoided by the tapered joints of this invention is the "notch" sensitivity peculiar to this type of material. Any rapid change of cross section such as created by a sharp shoulder or curve on a piece of pipe reduces the strength of that part as much as 50% below that otherwise normally obtainable from the section. Failure in this case invariably starts at the sharp corner. The notch sensitivity of carbon and graphite is further augmented by a "knife" action which takes place when slip joints with sharp edges and matching corners are assembled. This condition is remedied by the method of this invention by rounding the leading edges as shown in Fig. 4 and Fig. 5 to gain a spatulate or spreading action which smears cement into the joint instead of scraping it out. In this manner fracture propagation is virtually eliminated when a break does occur with a resultant localization of failure in the immediate location of the point of loading.

We claim:

1. A method of uniting in end to end relationship tubular shaped carbon and graphite articles, which method comprises concentrically profiling an end of one of said articles so as to enable it to receive a complementarily profiled end of another of said articles, said profiling of said end effecting no greater than a gradual change of cross section across a joint formed by interfitting said ends, applying a self-hardening cement to at least one of said ends, interfitting said articles and aging the cement in situ.

2. A method of uniting in end to end relationship tubular shaped carbon and graphite articles, which method comprises concentrically profiling an end of one of said articles so as to enable it to receive a complementarily profiled end of another of said articles, said profiling of said end effecting no greater than a gradual change of cross section across a joint formed by interfitting said ends, applying a thermosetting cement to one of said ends, interfitting said articles and heating said cement for a time between 8 and 24 hours.

3. A method of uniting tubular carbon and graphite articles which method comprises concentrically profiling an end of one of said articles so as to enable it to receive a complementarily profiled end of another of said articles; such profiling providing a clearance free of sudden change of cross-sectional area between the ends of said articles, applying a self-hardening cement to at least one of said ends; interfitting said articles and aging the self-hardening cement in situ.

4. A method of uniting tubular carbon and graphite articles which method comprises concentrically profiling an end of one of said articles so as to enable it to receive a complementarily profiled end of another of said articles; such profiling providing a clearance free of sudden change of cross-sectional area between the ends of said articles, applying a thermosetting cement to at least one of said ends; interfitting said articles and heating said cement.

5. A method of uniting tubular carbon and graphite articles which method comprises concentrically profiling an end of one of said articles so as to enable it to receive a complementarily profiled end of another said article; said profiling being provided in a spatulate shape having a clearance between 0.002 inch and 0.006 inch between the joint members for joint lengths between 3/8 inch and 7/8 inch; applying a self-hardening cement to at least one of said ends; interfitting said articles and aging the cement in situ.

6. A method of uniting tubular carbon and graphite articles, which method comprises concentrically profiling an end of one of said articles so as to enable it to receive a complementarily profiled end of another said article; said profiling being provided in a spatulate shape having a clearance between 0.002 inch and 0.006 inch between the joint members for joint lengths between 3/8 inch and 7/8 inch; applying a thermosetting cement to at least one of said ends; interfitting said articles and heating the cement.

7. A carbonaceous joint comprising tubular-shaped carbon and graphite articles having complementarily profiled tapered ends, said profiling being in a spatulate shape, providing a clearance of 0.002 inch to 0.006 inch between the joint members for joint lengths between 3/8 inch and 7/8 inch, and bound by a self-hardening cement.

References Cited in the file of this patent

UNITED STATES PATENTS

| 2,300,503 | Hamister et al. | Nov. 3, 1942 |
| 2,412,081 | Droll | Dec. 3, 1946 |
| 2,498,831 | Veitch | Feb. 28, 1950 |
| 2,512,230 | Greaves | June 20, 1950 |